United States Patent
Tsuchida et al.

(10) Patent No.: US 9,577,483 B2
(45) Date of Patent: Feb. 21, 2017

(54) ROTOR FOR A PERMANENT-MAGNET EMBEDDED MOTOR HAVING PERMANENT MAGNETS FITTED INTO A PLURALITY OF MAGNET INSERTION HOLES FORMED IN A CIRCUMFERENTIAL DIRECTION

(75) Inventors: Kazuchika Tsuchida, Tokyo (JP); Masahiro Nigo, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 221 days.

(21) Appl. No.: 14/390,083

(22) PCT Filed: Apr. 6, 2012

(86) PCT No.: PCT/JP2012/059565
§ 371 (c)(1),
(2), (4) Date: Dec. 31, 2014

(87) PCT Pub. No.: WO2013/150652
PCT Pub. Date: Oct. 10, 2013

(65) Prior Publication Data
US 2015/0137646 A1 May 21, 2015

(51) Int. Cl.
*H02K 1/27* (2006.01)
*H02K 1/28* (2006.01)

(52) U.S. Cl.
CPC ............... *H02K 1/276* (2013.01); *H02K 1/28* (2013.01)

(58) Field of Classification Search
CPC .......................................... H02K 1/27–1/2793
USPC ....................... 310/156.53, 156.56
IPC ....................................................... H02K 1/27
See application file for complete search history.

(56) References Cited

U.S. PATENT DOCUMENTS

| | | | | |
|---|---|---|---|---|
| 5,345,133 A | * | 9/1994 | Satake | H02K 21/12 310/156.45 |
| 6,208,054 B1 | * | 3/2001 | Tajima | H02K 29/03 310/156.53 |
| 6,717,315 B1 | * | 4/2004 | Tajima | H02K 1/278 310/156.45 |

(Continued)

FOREIGN PATENT DOCUMENTS

| | | |
|---|---|---|
| JP | H10-136595 A | 5/1998 |
| JP | H10-304610 A | 11/1998 |

(Continued)

OTHER PUBLICATIONS

Machine Translation, Hattori, JP 2001037125 A, Feb. 9, 2001.*

(Continued)

*Primary Examiner* — Thomas Truong
(74) *Attorney, Agent, or Firm* — Posz Law Group, PLC

(57) ABSTRACT

A rotor includes a plurality of magnets, and an annular rotor core having a plurality of magnet insertion holes formed in a circumferential direction, into which the magnets are respectively inserted, in which each of the magnet insertion holes is formed with a protruding portion A on an inner wall surface on an inner diameter side in a radial direction of the rotor, and each of the magnets is formed with a recessed portion that is fitted to the protruding portion A when the magnet is inserted into the magnet insertion holes. With this configuration, fixation of the magnets is facilitated, and generation of chipping and vibration noise due to a movement of the magnets at the time of activation or rotation can be suppressed, thereby enabling to provide the rotor having high quality and high reliability.

9 Claims, 13 Drawing Sheets

(56) References Cited

U.S. PATENT DOCUMENTS

2004/0256940 A1* 12/2004 Tsuruta .................. H02K 1/276
310/156.53
2013/0113328 A1* 5/2013 Kogure ................ H02K 1/2766
310/156.53

FOREIGN PATENT DOCUMENTS

| JP | 2001-37125 A | | 2/2001 |
|---|---|---|---|
| JP | 2001037125 A | * | 2/2001 |
| JP | 2002-101585 A | | 4/2002 |
| JP | 2005261169 A | * | 9/2005 |
| JP | 2005-279275 A | | 10/2005 |
| JP | 2005-279276 A | | 10/2005 |
| JP | 2007-60755 A | | 3/2007 |
| JP | 2007-68318 A | | 3/2007 |
| JP | 2007-336671 A | | 12/2007 |
| JP | 2010-16952 A | | 1/2010 |
| JP | 2010-207090 A | | 9/2010 |
| JP | 2011-55619 A | | 3/2011 |
| JP | 2011-135638 A | | 7/2011 |
| WO | 01/43259 A1 | | 6/2001 |

OTHER PUBLICATIONS

Machine Translation, Sakagami et al., JP 2005261169 A, Sep. 22, 2005.*
International Search Report of the International Searching Authority mailed Jul. 3, 2012 for the corresponding international application No. PCT/JP2012/059565 (and English translation).
Office Action mailed Mar. 24, 2015 in the corresponding JP application No. 2014-508985 (English translation included).

* cited by examiner

ROTOR FOR A PERMANENT-MAGNET EMBEDDED MOTOR HAVING PERMANENT MAGNETS FITTED INTO A PLURALITY OF MAGNET INSERTION HOLES FORMED IN A CIRCUMFERENTIAL DIRECTION

CROSS REFERENCE TO RELATED APPLICATION

This application is a U.S. national stage application of PCT/JP2012/059565 filed on Apr. 6, 2012, the contents of which are incorporated herein by reference.

TECHNICAL FIELD

The present invention relates to a rotor and a permanent-magnet embedded type motor.

BACKGROUND

In a magnet embedded type motor described in Patent Literature 1, each of permanent magnets is arranged at a position where a gap between an outer peripheral surface located on an outer side in a rotor radial direction of the permanent magnet and an outer peripheral wall surface of an insertion hole of a rotor core facing the outer peripheral surface is smaller than a gap between an inner peripheral surface located on an inner side in the rotor radial direction of the permanent magnet and an inner peripheral wall surface of the insertion hole of the rotor core facing the inner peripheral surface. Specifically, a protruding portion protruding into the insertion hole to abut on the inner peripheral surface of the permanent magnet is formed on a part of the inner peripheral wall surface of the insertion hole of the rotor core.

PATENT LITERATURE

Patent Literature 1: Japanese Patent Application Laid-open No. 2007-068318

However, when the permanent magnets are to be embedded in the rotor core described in Patent Literature 1 mentioned above, dimension accuracy of the permanent magnets is required. For example, a large fluctuation is present in the dimension of compression-molded permanent magnets. Therefore, at the time of inserting the permanent magnets into the insertion holes of the rotor core, if the permanent magnets are smaller than the dimension of the insertion holes, fixation thereof becomes difficult, or if the permanent magnets are larger than the dimension of the insertion holes, the permanent magnets cannot be inserted into the insertion holes. Further, if the permanent magnets are not appropriately fixed in the insertion holes, the permanents magnets may be chipped at the time of activation or rotation of the motor due to a movement of the magnets, or vibration noise may be generated.

SUMMARY

The present invention has been achieved in view of the above problems, and an object of the present invention is to provide a rotor and a permanent-magnet embedded type motor having high quality and high reliability that enable easy fixation of permanent magnets in magnet insertion holes while suppressing generation of chipping and vibration noise due to a movement of the permanent magnets at the time of activation or rotation.

In order to solve the aforementioned problems, a rotor according to one aspect of the present invention is configured to include: a plurality of permanent magnets; and an annular rotor iron core having a plurality of magnet insertion holes formed in a circumferential direction, into which the permanent magnets are inserted, wherein each of the magnet insertion holes is formed with a protruding portion on an inner wall surface on at least one of an outer diameter side and an inner diameter side in a radial direction of the rotor, and each of the permanent magnets is formed with a recessed portion that is fitted to the protruding portion when the permanent magnet is inserted into the magnet insertion hole.

According to the present invention, a rotor and a permanent-magnet embedded type motor that facilitate fixation of permanent magnets in magnet insertion holes, suppress generation of chipping and vibration noise due to a movement of the permanent magnets at the time of activation or rotation, and that have high quality and high reliability can be provided.

DETAILED DESCRIPTION

Exemplary embodiments of a rotor and a permanent-magnet embedded type motor according to the present invention will be explained below in detail with reference to the accompanying drawings. The present invention is not limited to the embodiments.

First Embodiment.

Figure 1:
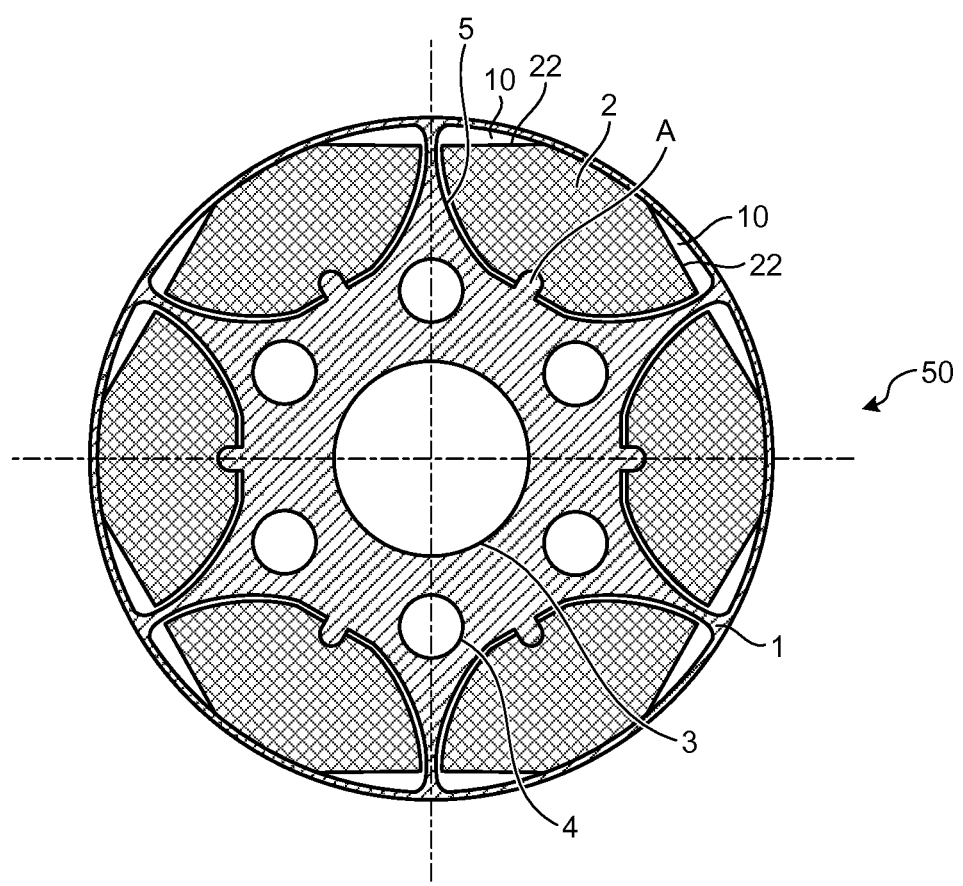
FIG. 1 shows a sectional configuration of a rotor 50 according to a first embodiment of the present invention.
Figure 2:
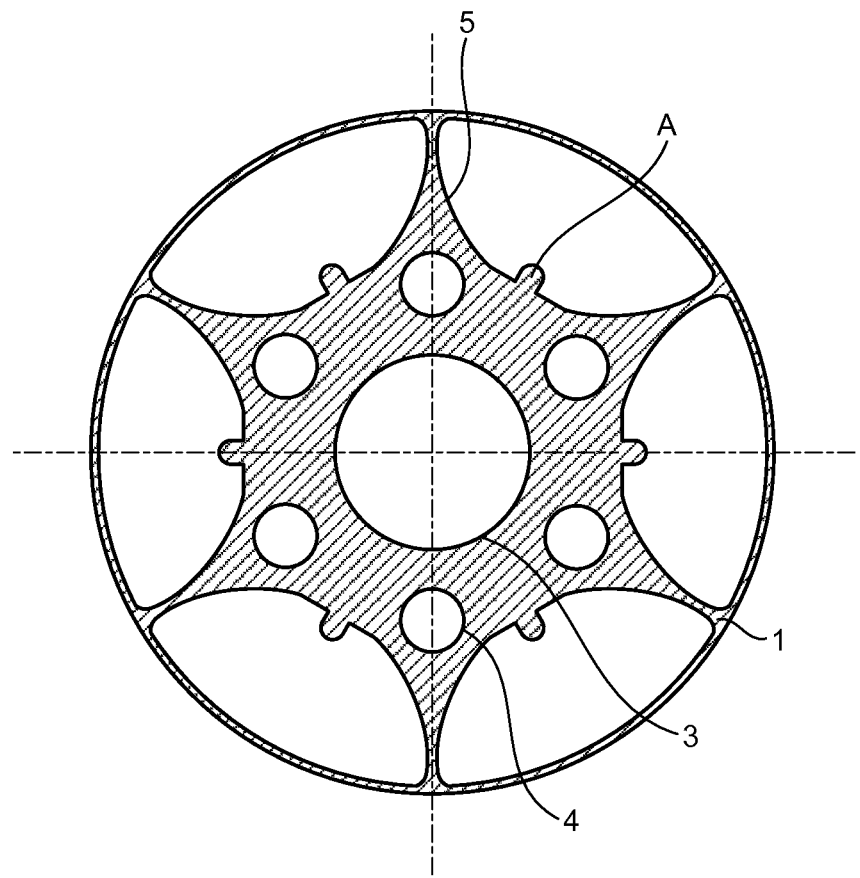
FIG. 2 is a sectional view showing a shape of a rotor core 1.
Figure 3:
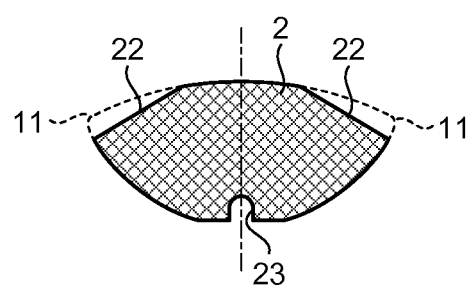
FIG. 3 is a sectional view showing a shape of a magnet 2.

FIG. 1 shows a sectional configuration of a rotor 50 according to a first embodiment of the present invention. FIG. 1 shows a state where magnets 2, which are permanent magnets, are inserted into a rotor core 1. FIG. 2 is a sectional view showing the shape of the rotor core 1. FIG. 3 is a sectional view showing the shape of each of the magnets 2. The magnets 2 in FIG. 3 are respectively inserted into magnet insertion holes 5 of the rotor core 1 in FIG. 2, to constitute the rotor 50 in FIG. 1. The rotor 50 is rotatably arranged inside of a stator (not shown) to constitute, for example, a permanent-magnet embedded type motor together with the stator. The configuration of the rotor 50 is explained below with reference to FIGS. 1 to 3.

The rotor core 1 (rotor iron core) is formed, for example, by punching out a thin electromagnetic steel plate (having, for example, a plate thickness of about 0.1 to 1.0 millimeter) into a predetermined shape with a mold and stacking a predetermined number of (a plurality of) the resultant steel plates. The rotor core 1 has an annular shape. A shaft hole 3 for passing a shaft (not shown) therethrough is formed approximately at the center of the rotor core 1. Holes 4, which are rivet holes, air holes and the like, are formed around the shaft hole 3 of the rotor core 1. In an example shown in FIG. 1, the number of the holes 4 is six.

A plurality of magnet insertion holes 5 are formed substantially at a regular interval in a circumferential direction of the rotor core 1 on an outer periphery of the rotor core 1. Each of The magnet insertion holes 5 has a substantially double circular-arc shape in a cross section, protruding toward both an inner diameter side (an inner peripheral side) and an outer diameter side (an outer peripheral side) of the rotor core 1. However, because a protruding portion A protruding into each of the magnets 2 is provided on the inner wall surface on the inner diameter side of each of the magnet insertion holes 5, the inner diameter side of the magnet insertion hole 5 is formed with a recessed portion corresponding to the protruding portion A on a circular arc. The inner wall surface on the inner diameter side of each of the magnet insertion holes 5 is an inner wall surface on the inner diameter side constituting the magnet insertion holes 5 in the rotor core 1 as a whole. In the example shown in FIG. 1, six magnet insertion holes 5 are formed, and the magnet 2 is inserted and embedded in each of the magnet insertion holes 5.

The magnets 2 are permanent magnets such as ferrite magnets. Each of the magnets 2 has, for example, a surface on the outer diameter side (the outer peripheral side), which is formed substantially in a circular-arc shape and protrudes toward the outer diameter side, and a surface on the inner diameter side (the inner peripheral side), which is also formed substantially in a circular-arc shape and protrudes toward the inner diameter side, so as to be inserted into the corresponding magnet insertion hole 5. That is, each of the magnet insertion holes 5 is formed in a substantially double circular-arc shape in a cross section. However, a recessed portion 23 to be fitted to the protruding portion A is provided on the surface on the inner diameter side of each of the magnets 2 in such a manner as to correspond to the protruding portion A provided in the magnet insertion hole 5 (FIG. 3).

Furthermore, each of the magnets 2 has a shape in which circumferential opposite ends on the outer diameter side thereof are, for example, linearly cut off with respect to the corresponding magnet insertion hole 5. In other words, each of the magnet insertion holes 5 is formed to produce voids 10 at the circumferential opposite ends on the outer diameter side, with the corresponding magnet 2 being inserted. That is, the voids 10 are formed between flat end faces 22 formed by cutting off the circumferential opposite ends on the outer diameter side of the corresponding magnet 2 and a wall surface of the rotor core 1 constituting the magnet insertion hole 5. The voids 10 have such a shape that the radial width increases from the circumferential center of the magnet 2 toward the end thereof. FIG. 3 virtually shows portions 11 cut off from the magnet 2 in the double circular-arc shape and shows a state in which the flat end faces 22 are formed.

The magnets 2 are arranged in such a manner that the magnetization directions thereof respectively become their radial directions. Further, the six magnets 2 are arranged in such a manner that directions from the N pole toward the S pole are alternated in the circumferential direction. The rotor 50 of an embedded magnet type motor (an IPM (Interior Permanent Magnet) motor) is constituted in this way. In the example illustrated, the number of the magnet insertion holes 5 and the number of the magnets 2 are six, respectively, for example, and the number of magnetic poles of the rotor 50 is six, for example. However, the numbers thereof are not limited to six, and generally it will be sufficient if a plurality of magnetic poles are formed.

Operations and effects of the rotor 50 configured as described above are explained next. Demagnetization is a phenomenon that should be avoided in the motor. A magnetic force of the demagnetized magnet 2 cannot be recovered, which causes a decrease in efficiency or, in the case of sensorless drive, prevents the motor from being activated due to a fluctuation in a control constant to be used at the time of activation.

Figure 4:
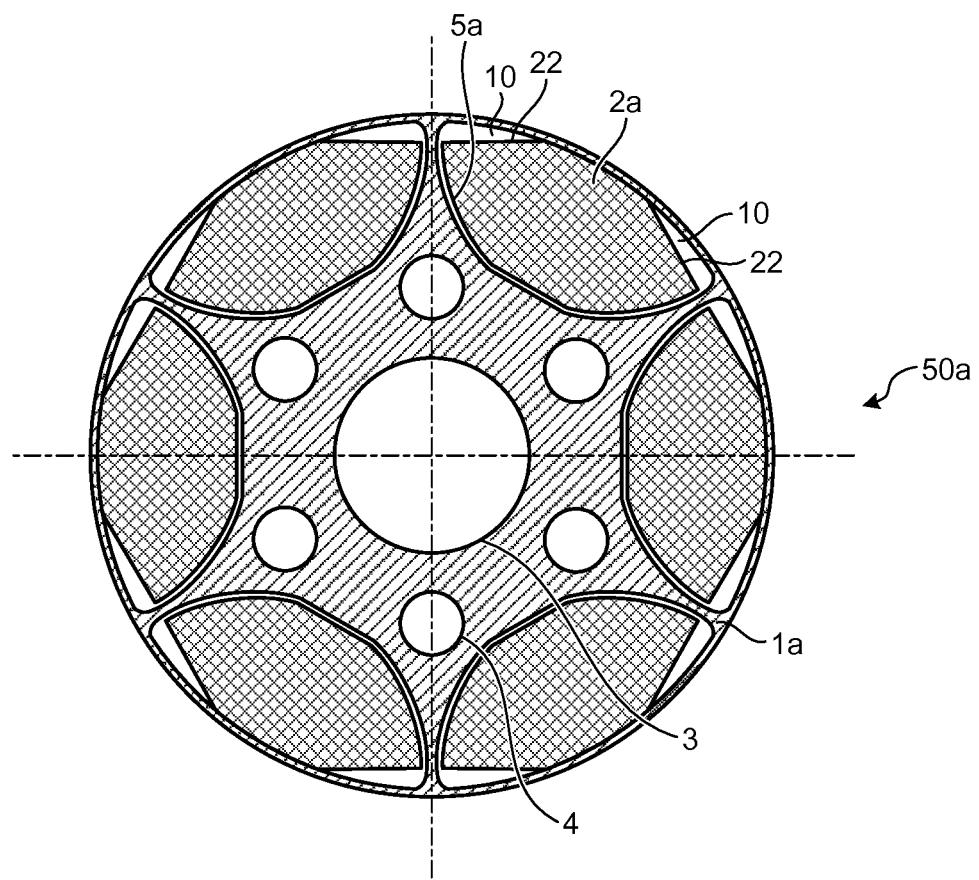
FIG. 4 shows a sectional configuration of a rotor 50a in which protruding portions A are not provided.

In the embedded magnet type motor (IPM) in which the magnets 2 are embedded in the rotor core 1, portions easily demagnetized are circumferential ends on the outer diameter side of each of the magnets 2. Therefore, by cutting off those easily demagnetized portions, a magnet having a high resistance against demagnetization can be obtained (FIG. 3). In FIG. 4, a configuration in which the protruding portions A are not provided in FIG. 1 is shown. As shown in FIG. 4, a rotor 50a is configured to include a rotor core 1a and magnets 2a, which are permanent magnets, inserted into the magnet insertion holes 5a of the rotor core 1a. However, the protruding portions A are not provided in the rotor core 1a, and thus the recessed portions 23 are not provided in the magnets 2a. However, as in the case of FIG. 1, because the circumferential opposite ends on the outer diameter side of each of the magnets 2 are cut off, the voids 10 are formed between the inner wall surface and the end faces 22 in each of the magnet insertion holes 5a when the magnets 2a are inserted into the magnet insertion holes 5a. In FIG. 4, the same constituent elements as in FIG. 1 are denoted by the same reference signs.

In the configuration of FIG. 4, each of the magnets 2a becomes smaller than the corresponding magnet insertion hole 5a by cutting the circumferential ends on the outer diameter side of the magnet 2a. Therefore, the magnet 2a may move within the magnet insertion hole 5a. Generally, the magnet 2a does not move due to the magnetic force thereof. However, the magnet 2a may move due to a suction force or the same induced from a stator when the rotor is activated to start operating (rotating), and thus abnormal noise may occur during the operation, or the magnet 2a may contact with the inner wall surface of the corresponding magnet insertion hole 5a to be chipped. As a countermeasure against it, the voids 10 in each of the magnet insertion holes 5a can be filled with an electromagnetic steel plates. However, this leads to an easy demagnetization, and thus the voids 10 are indispensable at any rate. Therefore, a structure that can fix the magnets 2a while preventing demagnetization is required.

Therefore, in the present embodiment, with a structure in which the protruding portions A as shown in FIG. 1 are provided, the magnets 2 can be fixed, for example, from the inner diameter side, and the magnets 2 can be prevented from moving while having a structure with a high resistance against demagnetization.

According to the present embodiment, the protruding portion A for magnet fixing is provided in the rotor core 1 to protrude into each of the magnet insertion holes 5, and each of the magnets 2 includes the recessed portion 23 to be fitted to the protruding portion A. The protruding portion A is fitted into the recessed portion 23, thereby enabling easy and stable fixation of the magnet 2 within the magnet insertion hole 5. Accordingly, as compared to a mode in which the magnet 2 is pressed and fixed by the protruding portion A (Patent Literature 1), the magnet 2 can be efficiently fixed in each of the magnet insertion holes 5 without requiring a strict dimension accuracy of the magnet 2.

On the other hand, in the motor described in Patent Literature 1, the magnets are pressed against the outer diameter side and fixed by the protruding portions provided on a part of the inner peripheral wall surfaces of the insertion holes, so that the magnets do not move in the magnet insertion holes. However, this requires thickness accuracy of the magnets in the radial direction and, in a compression-molded product such as a ferrite magnet, a fluctuation in tolerance at the time of molding is large and is thus difficult to fix the magnets by applying this conventional technique.

As explained above, according to the present embodiment, a movement of the magnet 2 in each of the magnet insertion holes 5 can be suppressed, and abnormal noise and chipping of the magnet at the time of operation can be prevented. Accordingly, the rotor 50 having high quality and high reliability and a motor including this rotor 50 can be provided. Furthermore, even if a fluctuation is present in the dimension of the magnets 2 at the time of molding, the magnets 2 can be fixed efficiently.

According to the present embodiment, by forming each magnet 2 in such a shape that the circumferential ends thereof on the outer diameter side of each of the magnet insertion holes 5 are cut off, the voids 10 are provided at the circumferential ends of each of the magnet insertion holes 5 on the outer diameter side, with the magnet 2 inserted into each of the magnet insertion holes 5, thereby enabling to prevent demagnetization of the magnet 2. In FIG. 1, a configuration in which the voids 10 are not provided is also possible.

Second Embodiment.

Figure 5:
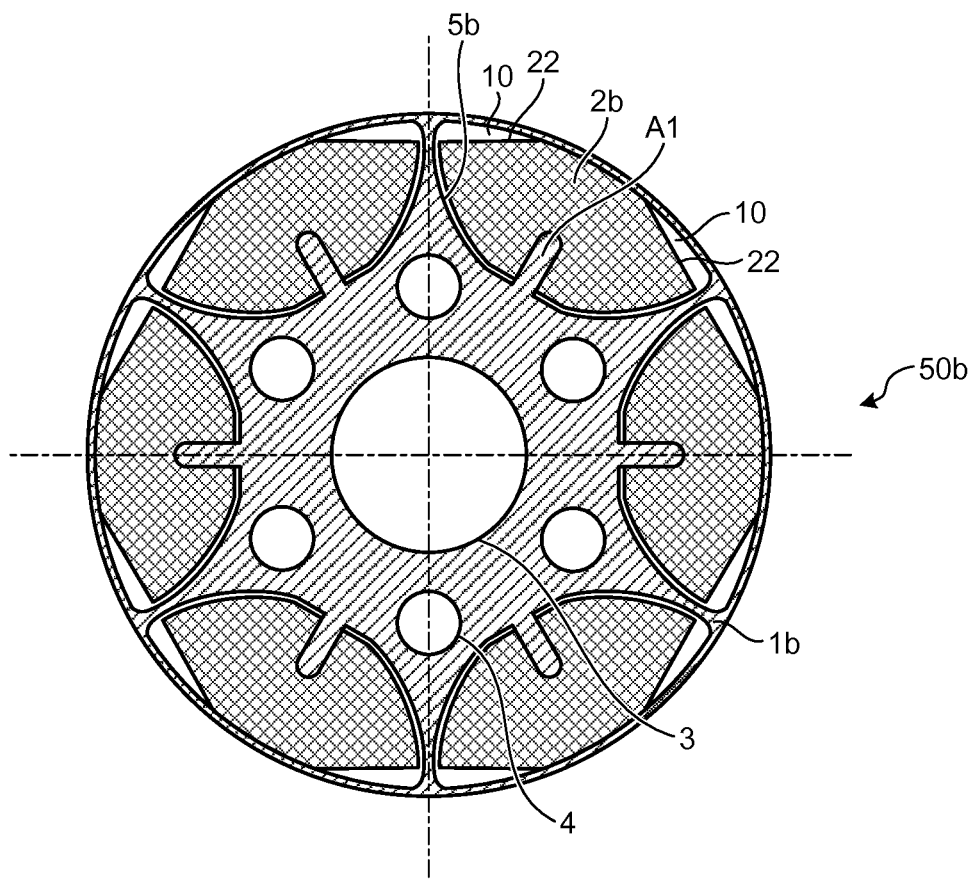
FIG. 5 shows a sectional configuration of a rotor 50b according to a second embodiment of the present invention.
Figure 6:
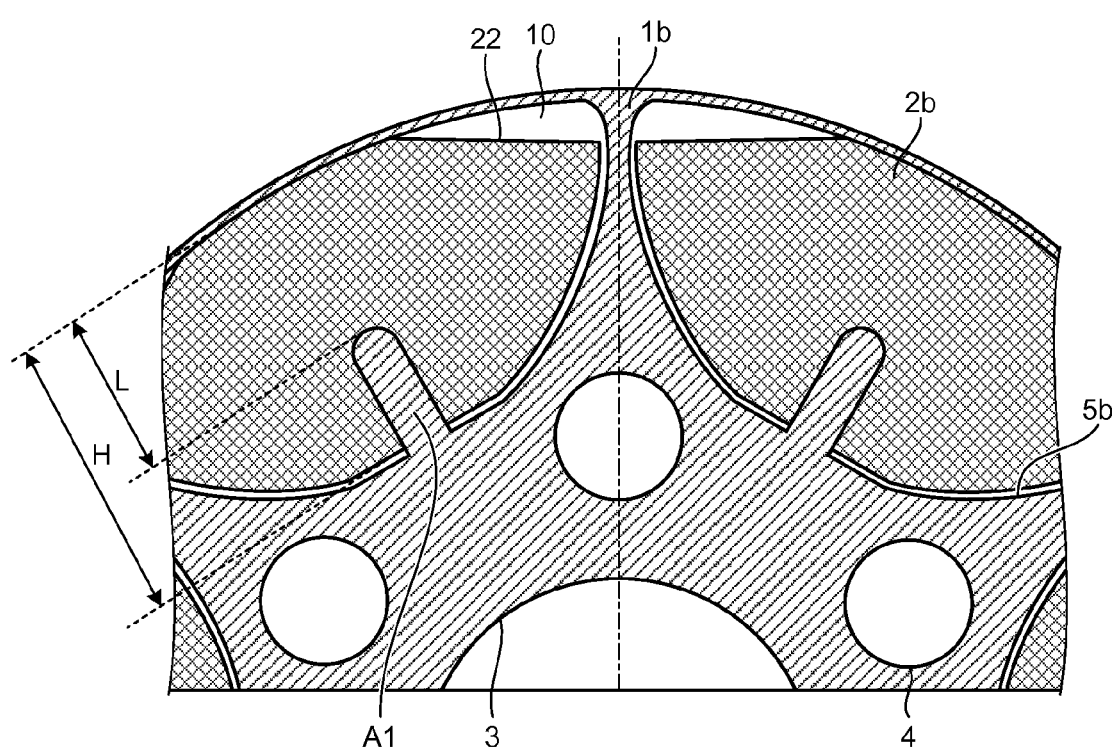
FIG. 6 is a partial enlarged view of FIG. 5.

FIG. 5 shows a sectional configuration of a rotor 50b according to a second embodiment of the present invention. FIG. 6 is a partially enlarged view of FIG. 5. In FIGS. 5 and 6, the rotor 50b includes a rotor core 1b and magnets 2b, which are permanent magnets, inserted into magnet insertion holes 5b of the rotor core 1b, respectively. As in the case of the first embodiment, because circumferential opposite ends on an outer diameter side of each of the magnets 2b are cut off, the voids 10 are formed at circumferential opposite ends on an outer diameter side in each of the magnet insertion holes 5b, with the magnet 2b inserted into each of the magnet insertion holes 5b. Furthermore, protruding portions A1 are provided in the rotor core 1b, and recessed portions of the magnets 2b are fitted thereto, respectively.

According to the present embodiment, a radial length of each of the protruding portions A1 is limited to a shape longer than a circumferential width thereof, and the radial length of the protruding portion A1 is longer than that of the protruding portion A in FIG. 1. Other configurations are identical to those in the first embodiment and the same constituent elements as in FIG. 1 are denoted by the same reference signs in FIGS. 5 and 6.

As the radial length of the protruding portion A1 increases, the fixation effect increases. However, if the radial length thereof is too long, a demagnetizing field from the stator may pass through the protruding portion A1, thereby causing demagnetization. Therefore, it is desired that a shortest distance L between the protruding portion A1 and the inner wall surface of the corresponding magnet insertion hole 5b facing the protruding portion A1 is equal to or longer than a half of the magnet thickness H (L≥H/2). The inner wall surface of the magnet insertion hole 5b facing the protruding portion A1 is an inner wall surface of the rotor core 1b facing the leading end of the protruding portion A1 and constituting the magnet insertion hole 5b. The magnet thickness H is a maximum thickness in the radial direction of the magnet 2b.

According to the present embodiment, by setting the length of the protruding portion A1 to meet L≥H/2, more stable fixation of the magnets 2b can be realized while demagnetization of the magnets 2b is prevented. Other configurations, operations, and effects of the present embodiment are identical to those in the first embodiment.

Third Embodiment

Figure 7:
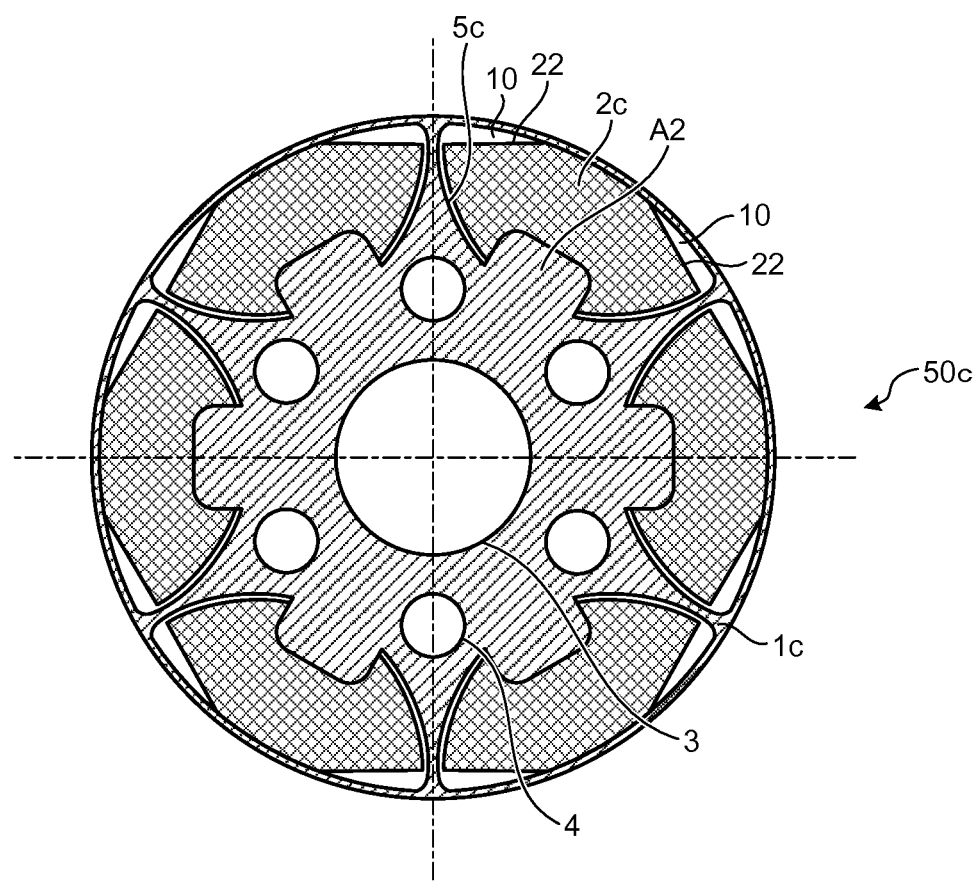
FIG. 7 shows a sectional configuration of a rotor 50c according to a third embodiment of the present invention.
Figure 8:
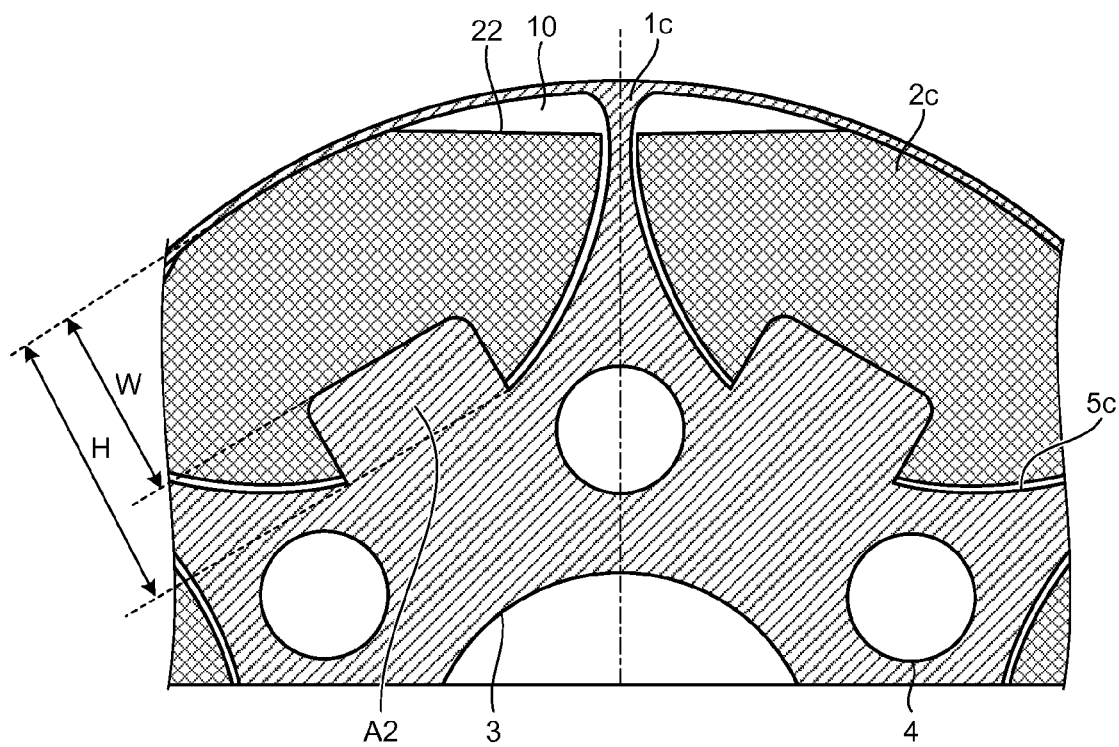
FIG. 8 is a partial enlarged view of FIG. 7.

FIG. 7 shows a sectional configuration of a rotor 50c according to a third embodiment of the present invention. FIG. 8 is a partially enlarged view of FIG. 7. In FIGS. 7 and 8, the rotor 50c includes a rotor core 1c and magnets 2c, which are permanent magnets, inserted into magnet insertion holes 5c of the rotor core 1c, respectively. As in the case of the first embodiment, because circumferential opposite ends on an outer diameter side of each of the magnets 2c are cut off, the voids 10 are formed at circumferential opposite ends on an outer diameter side in each of the magnet insertion holes 5c, with the magnet 2c inserted into each of the magnet insertion holes 5c. Furthermore, protruding portions A2 are provided in the rotor core 1c, and recessed portions of the magnets 2c are fitted thereto, respectively.

According to the present embodiment, a circumferential width of the protruding portion A2 is limited to a shape longer than a radial length thereof. Other configurations are identical to those in the first embodiment and the same constituent elements as in FIG. 1 are denoted by the same reference signs in FIGS. 7 and 8.

As the radial length of the protruding portion A2 increases, the fixation effect increases. However, if the radial length thereof is too long, a demagnetizing field from the stator may pass through the protruding portion A2, thereby causing demagnetization as in the case of the second embodiment. Therefore, it is desired that a shortest distance W between the protruding portion A2 and the inner wall surface of the corresponding magnet insertion hole 5c facing the protruding portion A2 is equal to or longer than a half of the magnet thickness H (W≥H/2). The magnet thickness H is a maximum thickness in the radial direction of the magnet 2c.

According to present embodiment, by setting the length of the protruding portions A2 to meet W≥H/2, more stable fixation of the magnets 2c can be realized while demagnetization of the magnets 2c is prevented. Other configurations, operations, and effects of the present embodiment are identical to those in the first embodiment.

Fourth Embodiment.

Figure 9:
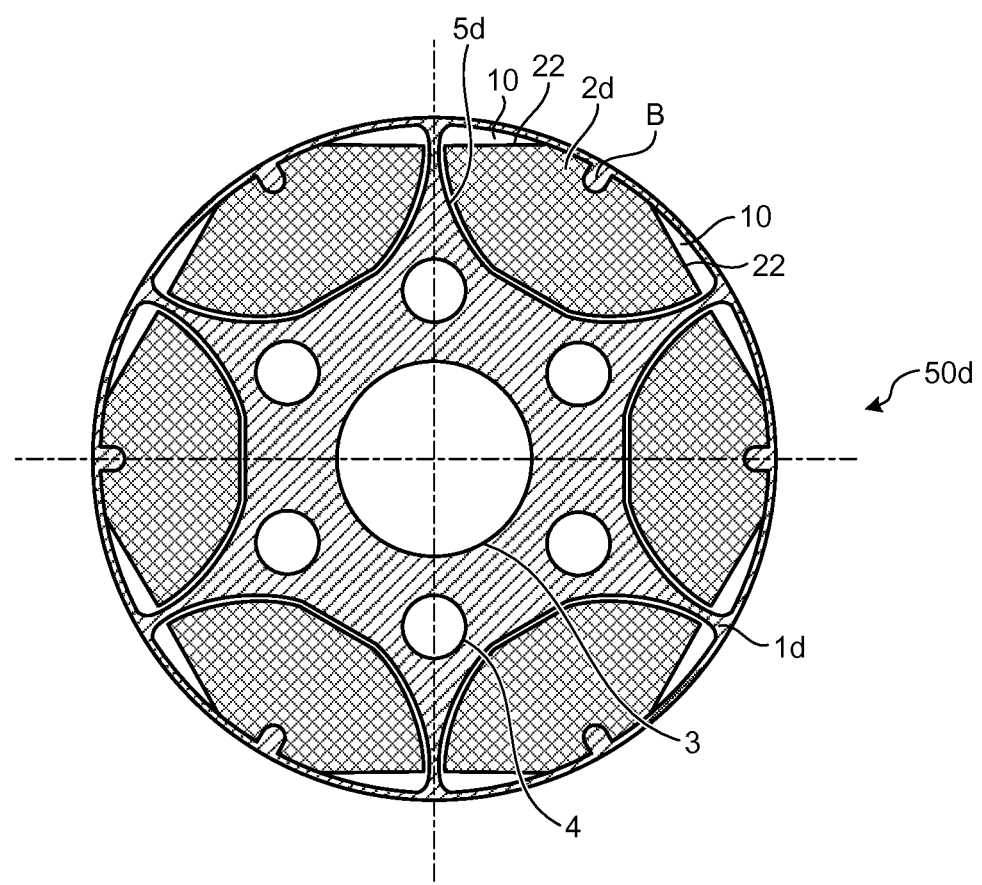
FIG. 9 shows a sectional configuration of a rotor 50d according to a fourth embodiment of the present invention.

FIG. 9 shows a sectional configuration of a rotor 50d according to a fourth embodiment of the present invention. In FIG. 9, the rotor 50d includes a rotor core 1d and magnets 2d, which are permanent magnets, inserted into magnet insertion holes 5d of the rotor core 1d, respectively. As in the case of the first embodiment, because circumferential opposite ends on an outer diameter side of each of the magnets 2d are cut off, the voids 10 are formed at circumferential opposite ends on an outer diameter side in each of the magnet insertion holes 5d, with the magnet 2d inserted into each of the magnet insertion holes 5d.

According to the present embodiment, a protruding portion B protruding into each of the magnet insertion holes 5d is provided on the inner wall surface on the outer diameter side of each of the magnet insertion holes 5d. The inner wall surface on the outer diameter side of each of the magnet insertion holes 5d is the inner wall surface on the outer diameter side constituting each of the magnet insertion holes 5d in the rotor core 1. That is, the protruding portion B is provided on the inner wall surface of each of the magnet insertion holes 5d facing the side on which the protruding portion A is provided in FIG. 1. Corresponding to the fact that each of the protruding portions B is provided in each of the magnet insertion holes 5d, the recessed portion to be fitted to the protruding portion B is provided on the surface on the outer diameter side of each of the magnets 2d. Other configurations are identical to those in the first embodiment and the same constituent elements as in FIG. 1 are denoted by the same reference signs in FIG. 9.

In this manner, even with the configuration in which the protruding portion B is provided on the inner wall surface on the outer diameter side of each of the magnet insertion holes 5d, the corresponding magnet 2d can be easily and stably fixed in each of the magnet insertion holes 5d. Other configurations, operations, and effects of the present embodiment are identical to those in the first embodiment.

Fifth Embodiment.

Figure 10:
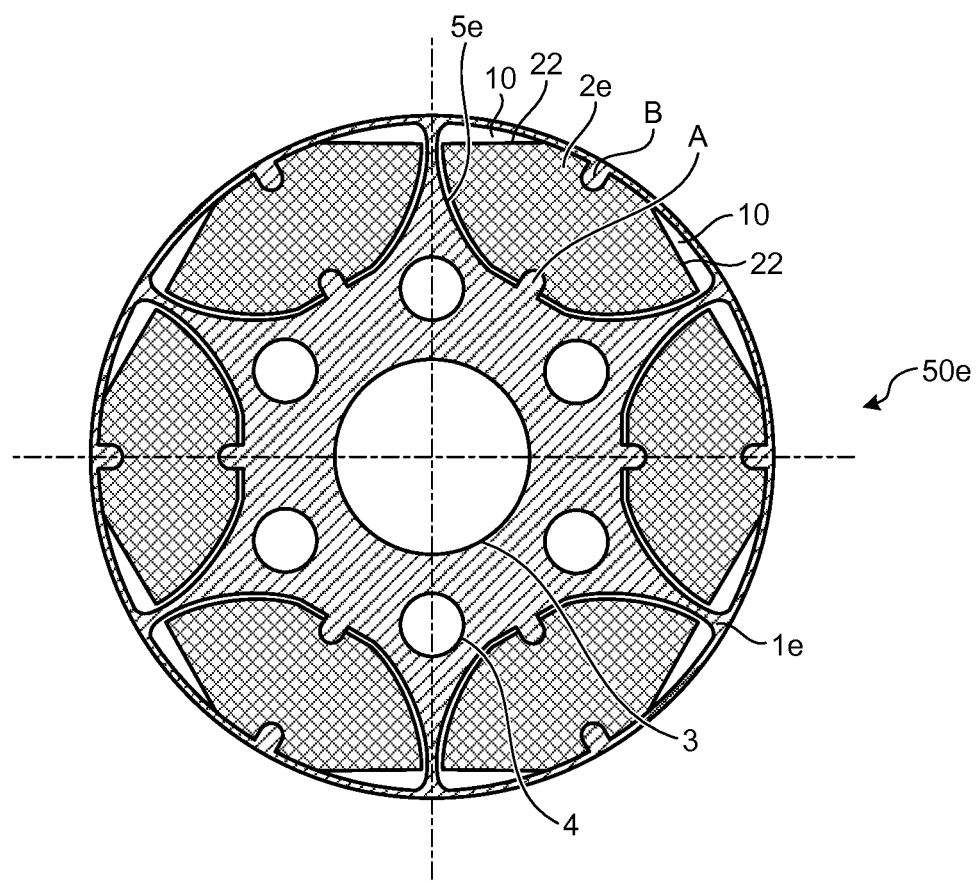
FIG. 10 shows a sectional configuration of a rotor 50e according to a fifth embodiment of the present invention.

FIG. 10 shows a sectional configuration of a rotor 50e according to a fifth embodiment of the present invention. In FIG. 10, the rotor 50e includes a rotor core 1e and magnets 2e, which are permanent magnets, inserted into the magnet insertion holes 5e of the rotor core 1e, respectively. As in the case of the first embodiment, because circumferential opposite ends on an outer diameter side of each of the magnets 2e are cut off, the voids 10 are formed at circumferential opposite ends on an outer diameter side in each of the magnet insertion holes 5e, with the magnet 2e inserted into each of the magnet insertion holes 5e.

According to the present embodiment, the protruding portion A protruding into each of the magnet insertion holes 5e is provided on the inner wall surface on inner diameter side of each of the magnet insertion holes 5e, and the protruding portion B protruding into each of the magnet insertion holes 5e is provided on the inner wall surface on outer diameter side of each of the magnet insertion holes 5e. That is, the present embodiment is a combination of the first and fourth embodiments. Other configurations are identical to those in the first and fourth embodiments and the same constituent elements as in FIG. 1 or 9 are denoted by the same reference signs in FIG. 10.

In this manner, by providing the protruding portion A and the protruding portion B on the inner wall surface on the inner diameter side and the outer diameter side of each of the magnet insertion holes 5e respectively, more stable fixation of the magnets 2e can be realized. Other configurations, operations, and effects of the present embodiment are identical to those in the first and fourth embodiments.

Sixth Embodiment.

Figure 11:
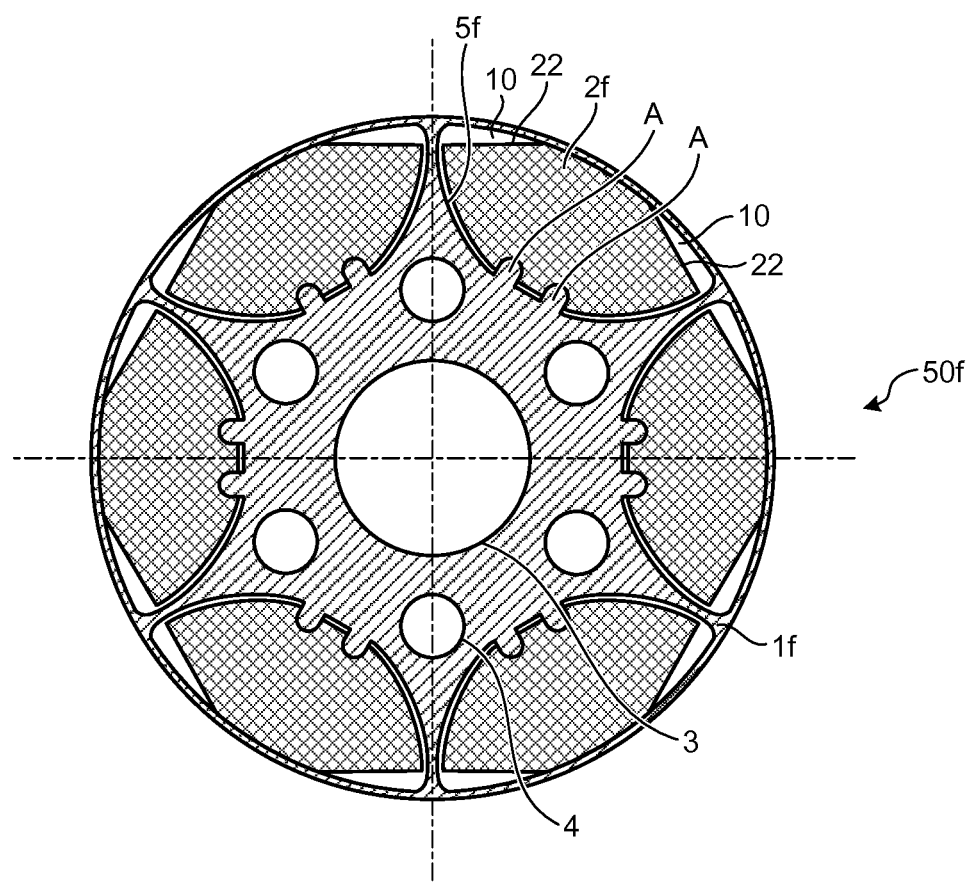
FIG. 11 shows a sectional configuration of a rotor 50f according to a sixth embodiment of the present invention.

FIG. 11 shows a sectional configuration of a rotor 50f according to a sixth embodiment of the present invention. In FIG. 11, the rotor 50f includes a rotor core 1f and magnets 2f, which are permanent magnets, inserted into magnet insertion holes 5f of the rotor core 1f. As in the case of the first embodiment, because circumferential opposite ends on an outer diameter side of each of the magnets 2f are cut off, the voids 10 are formed at circumferential opposite ends on an outer diameter side in each of the magnet insertion holes 5f, with the magnet 2d inserted into each of the magnet insertion holes 5f.

According to the present embodiment, two protruding portions A protruding into each of the magnet insertion holes 5f are provided on the inner wall surface on an inner diameter side of each of the magnet insertion holes 5f. That is, while the number of protruding portions A is one in the first embodiment, the present embodiment corresponds to a case where the number of protruding portions A is plural (two in the example shown in FIG. 11). Other configurations are identical to those in the first embodiment and the same constituent elements as in FIG. 1 are denoted by the same reference signs in FIG. 11.

In this manner, by providing a plurality of protruding portions A, more stable fixation of the magnets 2f can be realized. Other configurations, operations, and effects of the present embodiment are identical to those in the first embodiment.

A configuration in which a plurality of the protruding portions B are provided for each of the magnet insertion holes 5 in FIG. 9 is also possible. Furthermore, a configuration in which a plurality of at least either the protruding portions A or B are provided in FIG. 10 is also possible.

Seventh Embodiment.

Figure 12:
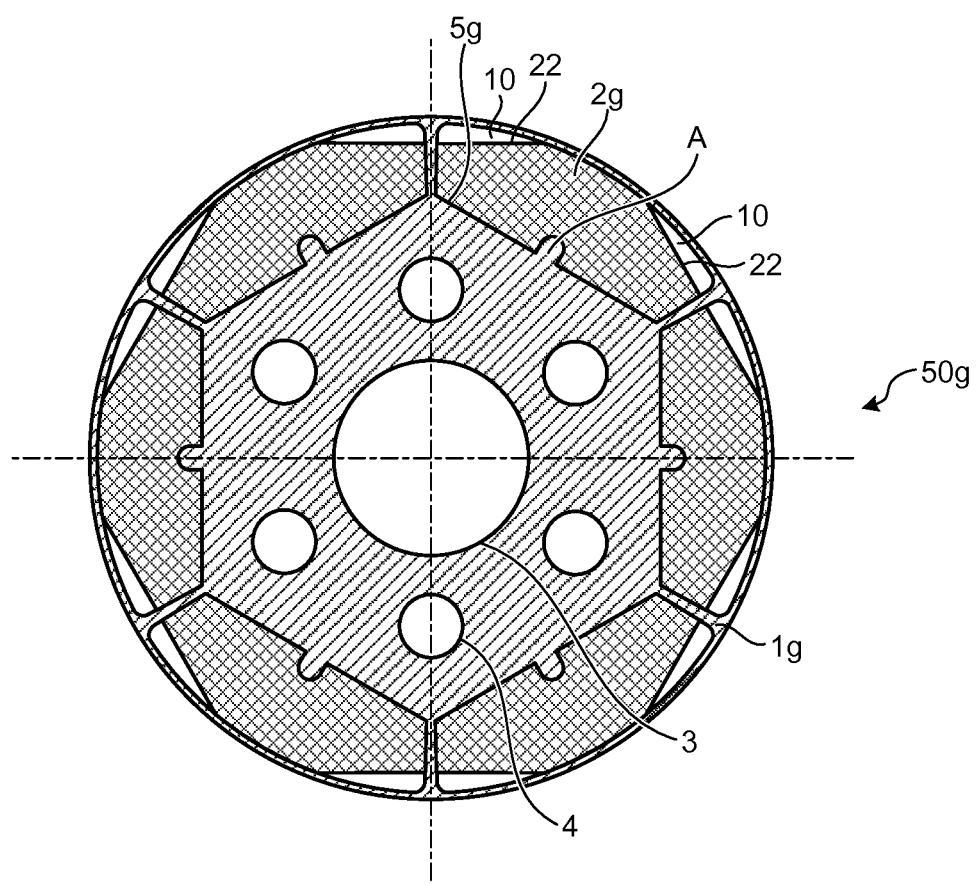
FIG. 12 shows a sectional configuration of a rotor 50g according to a seventh embodiment of the present invention.

FIG. 12 shows a sectional configuration of a rotor 50g according to a seventh embodiment of the present invention. In FIG. 12, the rotor 50g includes a rotor core 1g and magnets 2g, which are permanent magnets, inserted into magnet insertion holes 5g of the rotor core 1g, respectively. As in the case of the first embodiment, because circumferential opposite ends on an outer diameter side of each of the magnets 2g are cut off, the voids 10 are formed at circumferential opposite ends on an outer diameter side in each of the magnet insertion holes 5g, with the magnets 2g inserted into each of the magnet insertion holes 5g.

According to the present embodiment, an inner wall surface on an inner diameter side of each of the magnet insertion holes 5g is formed in a flat shape and the protruding portion A is provided on a part thereof. The surface on an inner diameter side of each of the magnets 2g is formed in a flat shape corresponding to the shape of the magnet insertion hole 5g, and the recessed portion to be fitted to the protruding portion A is provided thereon. That is, the present embodiment is a configuration example in a case where the inner diameter side of each of the magnets 2g is straight cut. Other configurations are identical to those in the first embodiment and the same constituent elements as in FIG. 1 are denoted by the same reference signs in FIG. 12.

According to the present embodiment, by providing the protruding portions A, stable fixation of the magnets 2g can be realized, and because the inner diameter side of each of the magnets 2g and the magnet insertion holes 5g have the flat shape, machining is facilitated. Other configurations, operations, and effects of the present embodiment are identical to those in the first embodiment. The configuration according to the present embodiment can be combined with the configuration according to any one of the second to sixth embodiments.

Eighth Embodiment.

Figure 13:
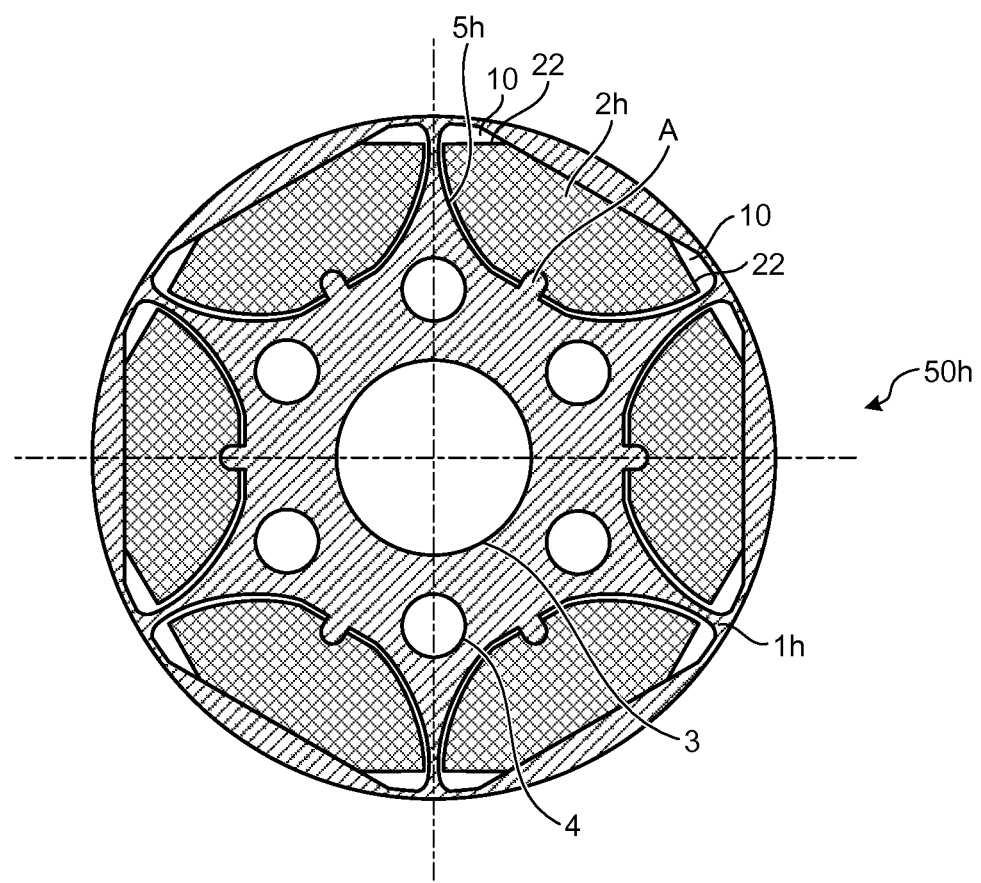
FIG. 13 shows a sectional configuration of a rotor 50h according to an eighth embodiment of the present invention.

FIG. 13 shows a sectional configuration of a rotor 50h according to an eighth embodiment of the present invention. In FIG. 13, the rotor 50h includes a rotor core 1h and magnets 2h, which are permanent magnets, inserted into magnet insertion holes 5h of the rotor core 1h, respectively. As in the case of the first embodiment, because circumferential opposite ends on an outer diameter side of each of the magnets 2h are cut off, the voids 10 are formed at circumferential opposite ends at least on an outer diameter side in each of the magnet insertion holes 5h, with the magnet 2h inserted into each of the magnet insertion holes 5h.

According to the present embodiment, an inner wall surface on the outer diameter side of each of the magnet insertion holes 5h is formed in a flat shape. An inner wall surface on an inner diameter side of each of the magnet insertion holes 5h is formed in a circular-arc shape protruding toward the inner diameter side, and a protruding portion A is provided on a part thereof. A surface on the outer diameter side of each of the magnets 2h is formed in a flat shape corresponding to the shape of the magnet insertion hole 5h. The surface on an inner diameter side of each of the magnets 2h is formed in a circular-arc shape protruding toward the inner diameter side and has a recessed portion to be fitted to the protruding portion A, in accordance with the shape of the magnet insertion hole 5h. That is, the present embodiment is a configuration example in a case in which the outer diameter side of each of the magnets 2h is straight cut. Other configurations are identical to those in the first embodiment and the same constituent elements as in FIG. 1 are denoted by the same reference signs in FIG. 13.

According to the present embodiment, by providing the protruding portions A, stable fixation of the magnets 2h can be realized, and because the outer diameter side of each of the magnets 2h and the magnet insertion holes 5h have the flat shape, machining is facilitated. Other configurations, operations, and effects of the present embodiment are identical to those in the first embodiment. The configuration according to the present embodiment can be combined with the configuration according to any one of the second to sixth embodiments.

Ninth Embodiment.

Figure 14:
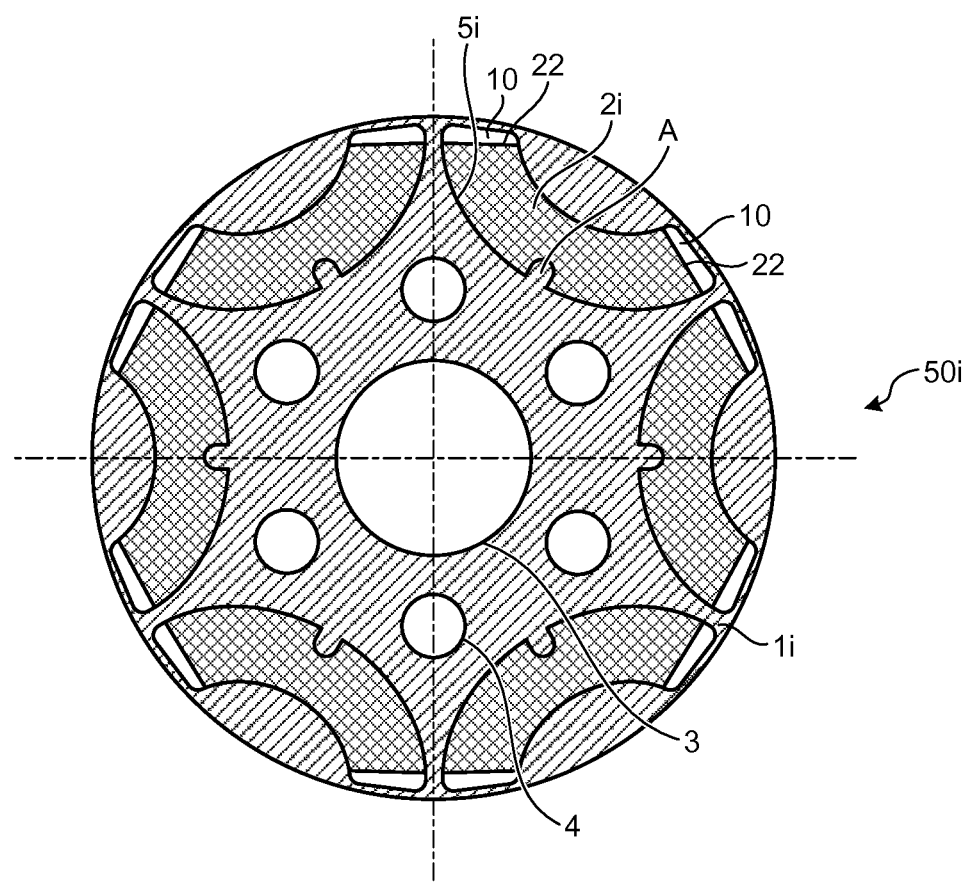
FIG. 14 shows a sectional configuration of a rotor 50i according to a ninth embodiment of the present invention.

FIG. 14 shows a sectional configuration of a rotor 50i according to a ninth embodiment of the present invention. In FIG. 14, the rotor 50i includes a rotor core 1i and magnets 2i, which are permanent magnets, inserted into magnet insertion holes 5i of the rotor core 1i, respectively. As in the case of the first embodiment, because circumferential opposite ends on an outer diameter side of each of the magnets 2i are cut off, the voids 10 are formed at circumferential opposite ends on an outer diameter side in each of the magnet insertion holes 5i, with the magnets 2i inserted into each of the magnet insertion holes 5i.

According to the present embodiment, the magnet insertion holes 5i and the magnets 2i have an inverted circular-arc shape protruding from the outer diameter side toward an inner diameter side. An inner wall surface on the inner diameter side of each of the magnet insertion holes 5i is formed in a circular-arc shape protruding toward the inner diameter side, and the protruding portion A is provided on a part thereof. An inner wall surface on the outer diameter side of each of the magnet insertion holes 5i is formed in a circular-arc shape protruding toward the inner diameter side. A surface on the inner diameter side of each of the magnets 2i is formed in a circular arc shape protruding toward the inner diameter side and has a recessed portion to be fitted to the protruding portion A, in accordance with the shape of the magnet insertion hole 5i. A surface on the outer diameter side of each of the magnets 2i is formed in a circular-arc shape protruding toward the inner diameter side, in accordance with the shape of the magnet insertion holes 5i. Other configurations are identical to those in the first embodiment and the same constituent elements as in FIG. 1 are denoted by the same reference signs in FIG. 14.

According to the present embodiment, by providing the protruding portions A, stable fixation of the magnets 2i can be realized. Other configurations, operations, and effects of the present embodiment are identical to those in the first embodiment. The configuration according to the present embodiment can be combined with the configuration according to any one of the second to sixth embodiments.

INDUSTRIAL APPLICABILITY

As described above, the present invention is useful as a rotor and a permanent-magnet embedded type motor.

The invention claimed is:

1. A rotor comprising:
a plurality of permanent magnets; and
an annular rotor iron core having a plurality of magnet insertion holes formed in a circumferential direction into which the permanent magnets are inserted respectively, wherein
each magnet insertion hole of the plurality of magnet insertion holes has an inner wall surface with a protruding portion, the protruding portion being provided on at least one of an outer diameter side and an inner diameter side of the inner wall surface and extending in a radial direction of the rotor iron core, and
each permanent magnet of the permanent magnets has a recessed portion that is fitted to the protruding portion of a corresponding magnet insertion hole of the plurality of magnetic insertion holes,
the outer diameter side of each permanent magnet has circumferential opposing ends, the circumferential opposing ends of the permanent magnets respectively have flat end faces and voids,
the voids of the circumferential opposing ends of each permanent magnet are provided respectively between the flat end faces of the circumferential opposing ends and a wall surface of the annular rotor iron core, and
each of the voids has a length in a direction along the flat end face of the circumferential opposing end of the permanent magnet greater than a maximum distance between the flat end face of the circumferential opposing end of the permanent magnet and the inner wall surface in the radial direction of the rotor iron core.

2. The rotor according to claim 1, wherein the length of the protruding portion in the radial direction is longer than the width of the protruding portion in the circumferential direction.

3. The rotor according to claim 1, wherein the length of the protruding portion in the radial direction is shorter than the width of the protruding portion in the circumferential direction.

4. The rotor according to claim 1, wherein the protruding portion is formed in such a manner that the shortest distance between the protruding portion and an inner wall surface of the magnet insertion hole facing the protruding portion is equal to or larger than a half of the thickness in the radial direction of the permanent magnet.

5. The rotor according to claim 1, wherein each of the permanent magnets has a double circular-arc shape protruding toward both on the inner diameter side and the outer diameter side.

6. The rotor according to claim 1, wherein the permanent magnet has a flat shape either on the inner diameter side or the outer diameter side.

7. The rotor according to claim 1, wherein the permanent magnet has an inverted circular-arc shape protruding from the outer diameter side toward the inner diameter side.

8. A permanent-magnet embedded type motor comprising:
the rotor according to claim 1.

9. The rotor according to claim 1, wherein the voids extend in the circumferential direction.

* * * * *